Patented Oct. 3, 1939

2,174,532

UNITED STATES PATENT OFFICE 2,174,532

PROCESS FOR SEPARATING PHENOLIC BODIES

Erwin Schwenk, Montclair, N. J., and Bradley Whitman, New York, N. Y., assignors to Schering Corporation, Bloomfield, N. J., a corporation of New Jersey No Drawing. Application October 4, 1935, Serial No. 43,526. In Germany October 5, 1934

19 Claims. (Cl. 260—397)

Our invention relates to the separation of phenolic substances from other substances occurring in natural and synthetic mixtures, and more particularly to the separation and purification of germinal gland hormones from crude mixtures containing the same.

It is the general object of the invention to provide an improved process for the separation of phenolic from non-phenolic substances in mixtures of the same, and particularly to obtain a more complete isolation of the phenols either in the pure form or in a form in which they can be further purified and the individual phenols or groups of phenols separated from each other in known ways.

While our process is of general application for the separation or isolation of phenols both as a group from more highly acidic and from neutral substances, and individually from each other, our invention will be described as applied to the separation and purification of hydroxy-hormones (for example, the female germinal gland hormone) from other substances, and also of neutral hormones, such as keto-hormones (for example, the male germinal gland hormone), from contaminating phenolic bodies.

The methods heretofore employed for the production of the female germinal gland hormone utilize for the purification of the raw extracts the fact that such hormones belong to the group of phenols and thus possess weakly acid properties. For this reason it has been the practice either to shake the solutions of the crude germinal gland extracts with aqueous alkalis of different concentrations or to treat the crude extracts with diluted alkalis, and the weakly acid hormones are then extracted from these solutions.

These procedures have various disadvantages. The weakly acid character of the female germinal gland hormones is responsible for the fact that not only do the aqueous alkalis extract these materials from their solutions in organic solvents, but conversely the hormones are taken up by the organic solvents from their aqueous alkali solutions. For this reason it is difficult to secure a quantitative extraction of the hormones. A further circumstance which is decidedly undesirable consists in the fact that all extracts containing female germinal gland hormones represent mixtures with acids, particularly with fatty acids. It is, however, known that the salts of these acids are in part soluble as such in the organic solvents employed, so that the extracts obtained never contain only the weakly acid hormones; on the contrary, they are always contaminated with greater or smaller quantities of fatty acid salts. All further operations are made much more difficult by these admixtures, as the fatty acid salts take up difficultly soluble substances into their solutions, so that the hormones which in themselves are insoluble in water are kept in solution and so are not separated.

In the corresponding recovery of the male germinal gland hormone from urine, the difficulties encountered in its separation are due in large measure to the fact that it is possible to separate this neutral material only with great trouble from the accompanying phenolic and acid substances.

We have found that all these difficulties can be avoided when in place of aqueous alkalis there are employed dry or anhydrous alkaline substances for the purification, for example, hydroxides or carbonates, preferably of the alkali metal or alkaline earth metal series, and also the alcoholates, either in the dry, solid condition or dissolved in a non-aqueous solvent, the weakly alkaline substances being employed to precipitate acids, and the strongly alkaline substances being used later to precipitate the phenols.

Our improved process has the advantage that it makes possible a convenient separation of the true acids and the weakly acid phenolic germinal gland hormones from each other and from the neutral hormones and the accompanying substances, depending upon whether anhydrous carbonates or hydroxides are employed. Also, by the use of anhydrous reagents, loss of hormone material to the organic solvent through hydrolysis of the salts of the hormones to be separated is avoided. According to our invention, crude extracts containing, for example, the female germinal gland hormones, if desired after a thoroughgoing hydrolysis, are taken up in an organic non-dissociating solvent, for example, ether or benzol, and then treated with powdered anhydrous sodium carbonate, preferably with agitation. The free acids, including the fatty acids, are bound by this treatment. In place of sodium carbonate there can in this case be employed calcium oxide or hydroxide. After the free acids have been completely bound in the manner described, the mixture is filtered and the hormone solution is then treated with, for example, powdered sodium hydroxide and boiled for a time with agitation; in this way the female germinal gland hormones are bound in the form of their salts by the caustic alkali. When upon further addition of powdered caustic alkali no further separation of material from the solution occurs, as can be observed by the coloring of the powder, the residue is filtered from the solution. The residue is thoroughly washed with the solvent employed and is then dried to remove the solvent, after which the powdered residue is dissolved in water. The further treatment can be conducted in various ways, for example, the solution can be acidified and all of the substances bound by the caustic alkali can be freed as a mixture and the further purification of the hormones can then be carried out by suitably treating the precipitate so obtained.

For recovering the male germinal gland hormone from a crude mixture containing the same, it is the separated organic solution that is further treated, the phenolic bodies being bound in the filtered residue.

As, however, in addition to the germinal gland hormones also other phenol-like bodies and likewise phenols as such are bound by the caustic alkali, it is necessary to effect separation of these substances from each other. The following manner of working up the caustic alkali portion is recommended: The mixture of sodium salts is dissolved in water and filtered from the insoluble material, for example, over glass wool. The mother liquor is then without further treatment thoroughly shaken with a suitable organic solvent such as, for instance, ether, to which it gives up the most weakly acid substances. By saturating the mother liquor with carbon dioxide, additional substances are precipitated which can be recovered by filtration. In the bicarbonate mother liquor only traces of phenolic hormones remain.

The invention will be further described in greater detail with the aid of the following examples which show by way of illustration several satisfactory procedures for carrying out the invention:

*Example 1.*—500 g. of a butyl alcohol extract of alkali and acid-hydrolyzed urine of mares are dissolved in 3 liters of ether and then heated with agitation with 100 g. of finely pulverized water-free sodium carbonate at the boiling point for two hours. The mixture is then filtered to separate excess sodium carbonate and the filtrate is treated for two hours, while being agitated, with 50 g. of finely powdered calcium oxide or 60 g. of calcium hydroxide to which there has been added a suitable quantity of anhydrous calcium sulphate for binding any water that may be present, and the mixture is then boiled again for two hours and then filtered. Both the sodium carbonate residue and the calcium oxide residue are shaken with water and made acid to congo with hydrochloric acid. After the inorganic salts have been completely dissolved, the acids contained in the crude preparation separate out in the form of a dark colored oil which congeals on cooling to a crystalline mass.

The filtered ether solution is then boiled with 100 g. of finely powdered sodium hydroxide to which 50 g. of anhydrous finely powdered sodium sulphate has been added, the boiling continuing for two hours with stirring. The white sodium hydroxide powder becomes colored a dark brown while the solution becomes almost completely decolorized. This treatment may be repeated with a smaller quantity of caustic alkali, for example, 50 g. The ether solution is now filtered from the residue. The filtrate contains the so-called neutral substances, such as cholesterin and similar materials and can be utilized for the recovery of these substances. After being washed with ether and heated to expel the latter, the brown-colored caustic alkali residue is treated with about 500 cc. of water. The major portion of the precipitate is dissolved by the water, only a comparatively small quantity of brownish material remaining undissolved. Upon treating the filtered alkali solution with acid, an oil separates out. Upon blowing such oil through with superheated steam, whereby the lower phenols, which, as known, are contained in every urine, are removed, the residue solidifies on cooling into a semi-crystalline mass. From the latter, the female germinal gland hormones can be recovered in crystalline form in known manner.

*Example 2.*—200 g. of the portion of the germinal gland hormones which is esterified with phthalic acid and is obtained according to German Patent No. 584,211 from the urine of mares, are dissolved in one liter of benzol and then boiled for two hours with finely powdered calcium hydroxide. After filtering from the insolubles, the benzol solution is heated at the boiling point for two hours with stirring with 50 g. of finely powdered sodium hydroxide. The benzol solution is thereby almost completely decolorized and now contains only sterin-like substances which possess no hormone properties. The insoluble residue is filtered off and then taken up with water, separated from the insolubles and the alkali solution is thoroughly shaken with ether. Upon shaking this ether solution with 5% potassium hydroxide solution followed by acidification, the delta follicle hormone is obtained as a fine light brown powder.

*Example 3.*—100 g. of chloroform extract obtained according to the method of Funk (Benjamin Harrow and Carl P. Sherwin "The Chemistry of the Hormones", Williams & Wilkins Co., page 157 et seq., Baltimore, 1934) from male urine are dissolved in two liters of ether and then shaken in the cold for two to three hours with 50 g. of finely powdered sodium hydroxide which is gradually added to the solution in several portions. After filtering to remove the insoluble material which includes the sodium salts of the phenols, the filtrate is heated for two hours on the water bath, with as much agitation as possible, with a further 20 g. of finely powdered sodium hydroxide and approximately the same quantity of anhydrous sodium sulphate. The mixture is filtered and the ether solution is evaporated to dryness. The resulting product amounts to 3 to 5 g. and contains all of the male sexual hormone.

*Example 4.*—An ether solution of a follicle hormone preparation containing about 300,000 mouse units per gram is treated with finely powdered anhydrous magnesium oxide for so long a time as acid compounds are removed therefrom. The filtered ether solution is then reacted with a solution of sodium hydroxide in alcohol (anhydrous) or of the corresponding quantity of metallic sodium dissolved in alcohol, the mixture being agitated to promote reaction. The sodium salts of the phenols separate out immediately. After standing for some time, the mixture is filtered and washed well with ether. The sodium salts remaining upon the filter are dissolved in water, the aqueous solution is freed from organic solvent (ether) by heating and if it is cloudy, it is filtered. Upon introducing carbon dioxide into the filtrate, the phenolic hormones are obtained which can be worked up in known manner to the pure crystalline substances.

This procedure can also be followed under suitable conditions for separating the male from the female sexual hormones.

It will be noted that in each of the examples described above, the separation of the phenolic materials from the other substances is effected under substantially anhydrous conditions, and best results will be obtained when the materials are as nearly completely free of water as possible. We have found that under such conditions, no hydrolysis of the salts of the phenols takes place and consequently no phenols are extracted by the ether or other organic solvent, the phenols remaining in the form of the insoluble salts and so are substantially completely separated. No portion of the product is thus lost in the case of the purification of a phenolic body, such as a phenolic hormone, while in the isolation of a neutral body, like a keto-hormone, no phenolic bodies remain in solution with such hormone.

Where in the claims we speak of a non-aqueous alkali, such term is to be understood as including not only the solid alkalis such as sodium and potassium hydroxide, but also the solutions of the alkali hydroxides or of alkali metal in a substantially anhydrous alcohol and the solutions of an alcoholate in a non-aqueous medium.

In the further development of the invention, we have found that a precipitation of the sodium salt of the phenolic hormones in solid form can be obtained also by treating the solution of the phenolic hormones in ether or other suitable non-dissociating solvents, if desired, after pre-treatment with weak bases in powder form such as, for example, sodium carbonate, magnesium oxide, and magnesium carbonate for removal of the acids, with a solution of an alcoholate or with an alcoholic solution of alkali hydroxide. By such treatment, the salts of the phenolic hormones are precipitated in solid, easily filterable form and can be readily separated from the mother liquor.

We claim:

1. In a process for separating phenols from an impure solution thereof in an organic solvent, the steps which comprise treating such solution under substantially anhydrous conditions with an excess of an inorganic alkaline compound capable of reacting with phenolic hydroxyls to effect precipitation of such phenols, and then separating the precipitated phenolate material.

2. In a process for separating phenols from an impure solution thereof in an organic solvent containing also acidic substances, the steps which comprise treating such solution with a relatively weakly alkaline inorganic metal compound to bind the acidic substances, filtering the mixture, reacting the filtrate under substantially anhydrous conditions with an inorganic, relatively strongly alkaline compound capable of reacting with phenolic hydroxyls, and separating the precipitate.

3. In a process for separating phenols from an impure solution thereof in an organic solvent, the steps which comprise treating such solution under substantially anhydrous conditions with an inorganic alkaline compound capable of reacting with phenolic hydroxyls, and with a water-binding compound, to effect precipitation of such phenols, and then separating the precipitated phenolate material.

4. The process according to claim 2 wherein the residue is dissolved in water and acidified to liberate the phenolic bodies.

5. In a process for separating phenols from an impure solution thereof in an organic solvent containing also acidic substances, the steps which comprise treating such solution with a relatively weakly alkaline compound of the group consisting of alkali metal carbonates and alkaline earth metal oxides, hydroxides and carbonates to bind the acidic substances, filtering the mixture, reacting the filtrate with a relatively strongly alkaline compound of the group consisting of alkali metal hydroxides and alcoholates under substantially anhydrous conditions, and separating the precipitate.

6. The process according to claim 5, wherein the alkaline compounds are employed in the solid form.

7. The process according to claim 5, wherein the strongly alkaline compound is employed in the form of an alcohol solution.

8. In a process for separating phenols from an impure solution thereof in an organic solvent containing also acidic substances, the steps which comprise treating the solution with a basic substance of the group consisting of alkali metal and alkaline earth metal carbonates and alkaline earth oxides and hydroxides in the solid state for removing the acid substances, then subjecting the solution to the action of a solid alkali metal hydroxide, and separating the solution from the insoluble material.

9. In a process for separating phenols from a crude solution of a non-phenolic hormone in a non-dissociating solvent, the steps which comprise treating such solution under substantially anhydrous conditions with an excess of an inorganic alkaline compound capable of reacting with phenolic hydroxyls to effect precipitation of such phenols in the form of phenolates, and then separating the precipitated phenolate material.

10. In a process for separating phenols from a crude solution of a non-phenolic hormone in a non-dissociating solvent containing also acidic substances, the steps which comprise treating such solution with a relatively weakly alkaline inorganic metal compound to bind the acidic substances, filtering the mixture, reacting the filtrate with an inorganic relatively strongly alkaline compound capable of reacting with phenolic hydroxyls under substantially anhydrous conditions, and separating the precipitate.

11. The process according to claim 9, wherein a water-binding compound is added to the solution together with the alkaline compound.

12. The process according to claim 10, wherein the residue is dissolved in water and acidified to liberate the phenols.

13. In a process for separating phenols from a crude solution of a hormone in a non-dissociating solvent containing also acidic substances, the steps which comprise treating such solution with a relatively weakly alkaline compound of the group consisting of alkali metal carbonates and alkaline earth metal oxides, hydroxides and carbonates, to bind the acidic substances, filtering the mixture, reacting the filtrate with a relatively strongly alkaline compound of the group consisting of alkali metal hydroxides and alcoholates under substantially anhydrous conditions and separating the residue.

14. The process according to claim 13 wherein the alkaline compounds are employed in the solid form.

15. The process according to claim 13 wherein the strongly alkaline compound is employed in the form of an alcohol solution.

16. The process for separating germinal gland hormones which comprises dissolving crude extracts containing such hormones in a non-dissociating organic solvent, treating the solution with a basic substance of the group consisting of alkali metal and alkaline earth metal carbonates and alkaline earth metal oxides and hydroxides in the solid state for removing the acidic substances, then subjecting the extract to the action of a solid alkali metal hydroxide, separating the solution from the insoluble material, and isolating the neutral hormones from the filtrate and the phenolic, weakly acid germinal gland hormones from the residue.

17. In a process for separating phenols from an impure solution thereof in an organic solvent, the steps which comprise treating such solution with a non-aqueous alkali under substantially anhydrous conditions to effect precipitation of such phenols, and then separating the precipitated phenols.

18. In a process for separating phenols from a crude solution of a hormone in a non-dissociating solvent, the steps which comprise treating such solution with a non-aqueous alkali under substantially anhydrous conditions to effect precipitation of such phenols, and then separating the precipitated phenols.

19. In a process for separating phenolic hormone substances from an impure solution thereof in an organic solvent, the steps which comprise treating such solution under substantially anhydrous conditions with an alkaline metal compound capable of reacting with phenolic hydroxyls to effect precipitation of such hormone substances, and then separating the precipitated phenolate material.

ERWIN SCHWENK.
BRADLEY WHITMAN.